US010989931B2

(12) United States Patent
     Chou

(10) Patent No.: US 10,989,931 B2
(45) Date of Patent: Apr. 27, 2021

(54) PHOTOPHORETIC DISPLAY DEVICE

(71) Applicant: Toyota Motor Engineering & Manufacturing North America, Inc., Plano, TX (US)

(72) Inventor: Chungchih Chou, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 232 days.

(21) Appl. No.: 16/262,306

(22) Filed: Jan. 30, 2019

(65) Prior Publication Data

US 2020/0241311 A1    Jul. 30, 2020

(51) Int. Cl.
    | | |
    |---|---|
    | *G02B 30/50* | (2020.01) |
    | *G02F 1/1677* | (2019.01) |
    | *G02F 1/01* | (2006.01) |
    | *G02F 1/1685* | (2019.01) |

(52) U.S. Cl.
     CPC .......... *G02B 30/50* (2020.01); *G02F 1/0126* (2013.01); *G02F 1/1677* (2019.01); *G02F 1/1685* (2019.01); *G02F 2203/03* (2013.01)

(58) Field of Classification Search
     CPC ..... G02B 30/50; G02F 1/1685; G02F 1/1677; G02F 1/0126; G02F 2203/03
     USPC ..................................................... 359/296
     See application file for complete search history.

(56) References Cited

U.S. PATENT DOCUMENTS

| | | | | |
|---|---|---|---|---|
| 6,466,184 | B1 * | 10/2002 | Whitesell ............... | G09G 3/025 345/6 |
| 6,997,558 | B2 * | 2/2006 | Perlin ..................... | G02B 30/50 353/7 |
| 8,658,988 | B2 * | 2/2014 | Betsui ..................... | G03B 21/14 250/458.1 |
| 9,229,311 | B2 | 1/2016 | Yeremian | |
| 10,129,517 | B2 * | 11/2018 | Smalley ............... | H04N 13/388 |
| 2016/0161068 | A1 * | 6/2016 | Smalley ................. | G03B 21/00 362/84 |
| 2017/0013251 | A1 | 1/2017 | Thigpen | |

(Continued)

FOREIGN PATENT DOCUMENTS

| | | |
|---|---|---|
| JP | 2018524639 A | 8/2018 |
| WO | 2018057902 A1 | 3/2018 |

OTHER PUBLICATIONS

Smalley, D., Nygaard, E., Squire, K. et al. A photophoretic-trap volumetric display. Nature 553, 486-490 (2018). https://doi.org/10.1038/nature25176 (Year: 2018).*

(Continued)

*Primary Examiner* — William R Alexander

(74) *Attorney, Agent, or Firm* — Dinsmore & Shohl LLP

(57) ABSTRACT

A photophoretic display device includes at least one trap light source configured to generate a trap beam, at least one illumination light source configured to generate an illumination beam, a void, and a first reflective surface. The trap beam enters the void and traps a first one or more scattering particles, the trap beam is incident on the first reflective surface at a first incidence angle and is reflected as a first reflected trap beam, the first reflected trap beam traps a second one or more scattering particles, and the illumination beam illuminates the first one or more scattering particles and the second one or more scattering particles that are trapped to generate a volumetric image.

20 Claims, 5 Drawing Sheets

(56) References Cited

U.S. PATENT DOCUMENTS

2018/0267326 A1    9/2018  Broadbent et al.
2019/0016052 A1*   1/2019  Clark ................... B29C 64/255

OTHER PUBLICATIONS

Zhiyong Gong, Yong-Le Pan, and Chuji Wang, "Optical configurations for photophoretic trap of single particles in air", Cite as: Rev. Sci. Instrum. 87, 103104 (2016); https://doi.org/10.1063/1.4963842 Submitted: May 3, 2016. Accepted: Sep. 16, 2016 . Published Online: Oct. 5, 2016 (Year: 2016).*

New Technique Generates Free-Floating 3D Images. Just Don't Call It a Hologram., https://www.seeker.com/gadgets/new-technique-generates-free-floating-3d-images-just-dont-call-it-a-hologram, published on Jan. 24, 2018.

* cited by examiner

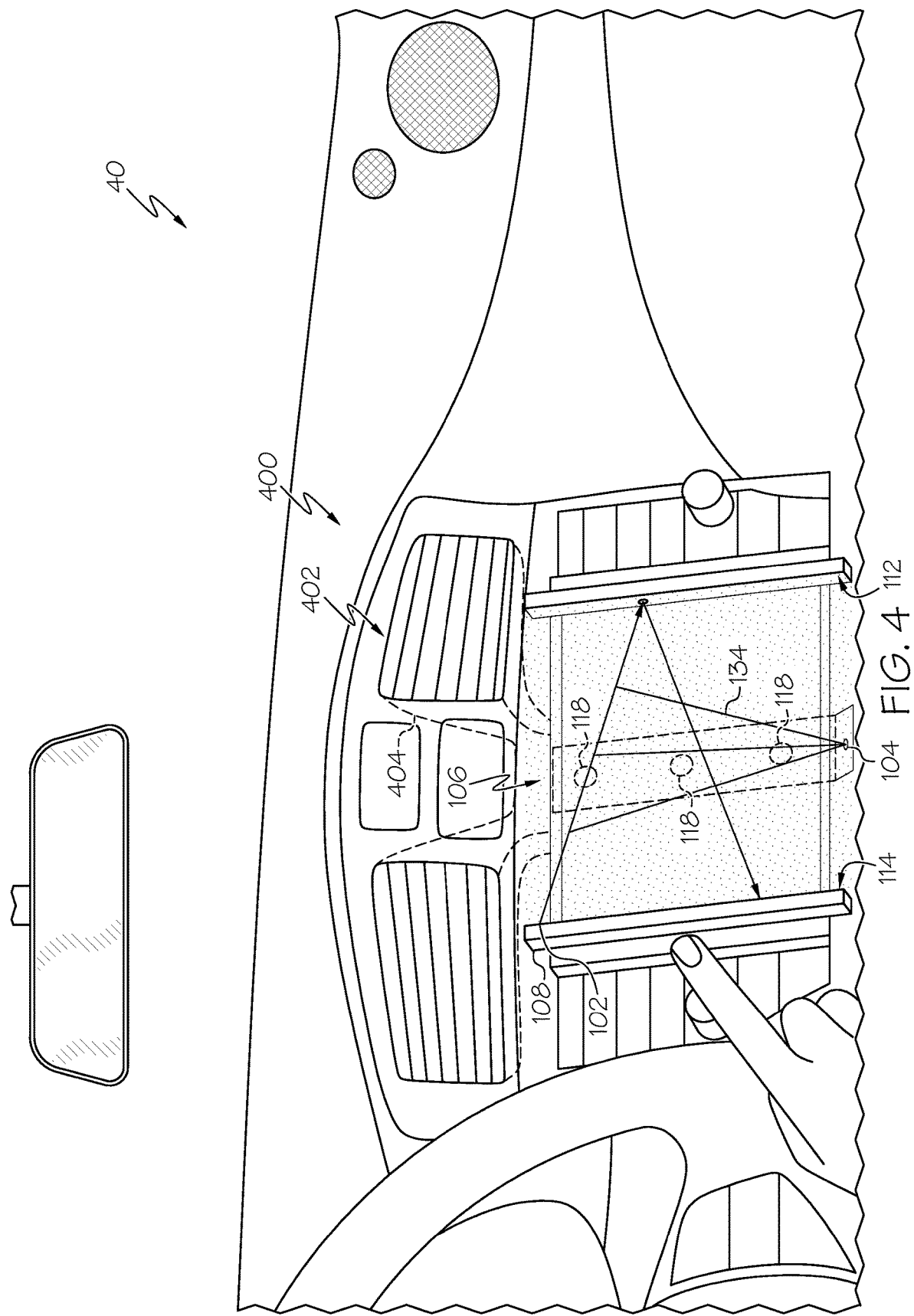

US 10,989,931 B2

PHOTOPHORETIC DISPLAY DEVICE

TECHNICAL FIELD

The present specification generally relates to systems and methods for generating volumetric images and more specifically to systems and methods for generating volumetric images using photophoretic display devices.

BACKGROUND

Planar display devices may lack the capability to display actual depth given their lack of three dimensions. Instead, one or more effects may simulate depth. For example, effects including directional emitters, occlusion, and transparency may simulate depth in a planar image. Generating three-dimensional images may reduce or eliminate the need for such simulation techniques. Accordingly, photophoretic display devices capable of generating a volumetric image may be desired.

SUMMARY

In one embodiment, a photophoretic display device includes at least one trap light source configured to generate a trap beam, at least one illumination light source configured to generate an illumination beam, a void, and a first reflective surface. The trap beam enters the void and traps a first one or more scattering particles, the trap beam is incident on the first reflective surface at a first incidence angle and is reflected as a first reflected trap beam, the first reflected trap beam traps a second one or more scattering particles, and the illumination beam illuminates the first one or more scattering particles and the second one or more scattering particles that are trapped to generate a volumetric image.

In another embodiment, a system for reflecting at least one trap beam of a photophoretic display includes at least one trap light source for generating the at least one trap beam, and a first reflective surface. The at least one trap beam traps one or more scattering particles, the at least one trap beam is incident on and reflected from the first reflective surface as at least one first reflected trap beam, and the at least one first reflected trap beam traps a second one or more scattering particles.

In yet another embodiment, a method of displaying a volumetric image using a photophoretic display device including at least one trap light source configured to generate a trap beam configured to trap one or more scattering particles, at least one illumination light source configured to generate an illumination beam, a void, and a first reflective surface, includes injecting the one or more scattering particles into the void, generating a trap beam with the trap light source and trapping a first one or more of the one or more scattering particles with the trap beam, generating an illumination beam with the illumination light source and illuminating the first one or more of the scattering particles with the illumination beam, reflecting the trap beam off of the first reflective surface as a first reflected trap beam, and trapping a second one or more of the one or more scattering particles with the first reflected trap beam.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 4 depicts an illustrative embodiment of a vehicle including an example application of the photophoretic display device of FIG. 1, according to one or more embodiments shown and described herein;

DETAILED DESCRIPTION

Figure 1:
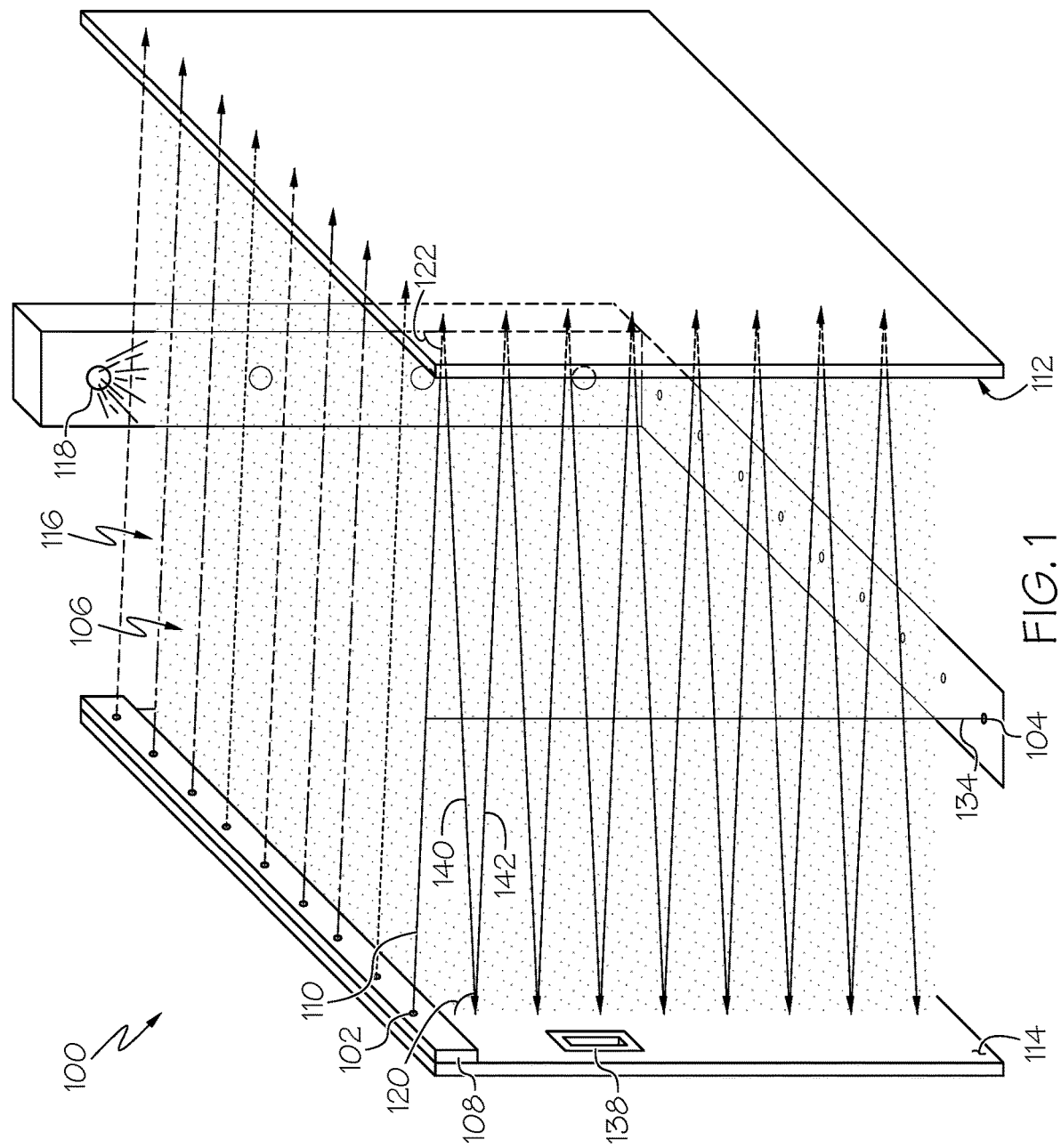
FIG. 1 depicts a photophoretic display device including a trap light source, an illumination light source, a first reflective surface, and a second reflective surface, according to one or more embodiments shown and described herein.

Volumetric images may be formed by volumetric display devices. Volumetric display devices create an image of one or more objects in three-dimensions. Accordingly, a volumetric image may exhibit actual depth rather than requiring the simulation of depth. Volumetric display devices may create light using one or more of emission, scattering, and relaying of light in the visible spectrum. Volumetric display devices may be capable of projecting static and dynamic images. One potential means of generating a volumetric image includes illuminating one or more particles with visible light. One or more particles may be suspended in a volume and illuminated with a light beam, for example, a laser. A trap beam (e.g., a trap light source beam) may be used to trap the one or more particles using the photophoretic effect, or "photophoresis."

Photophoresis refers to using light to impart forces on objects. For example, micron-sized particles may be suspended in air using light through direct and/or indirect photophoresis. For example, micron-sized particles may be suspended in a gas (e.g., aerosols, air, etc.) or a liquid (e.g., hydrocolloids) and may move when a light beam (e.g., a laser) of sufficient intensity and wavelength illuminates the particle. This movement can be due to radiation pressure force (direct photophoresis) and/or a non-uniform distribution of temperature of the particles in the fluid medium (indirect photophoresis). In some embodiments, an electrostatic force generated within the beam of light may impart one or more forces on the particle. Relatedly, in a fluid mixture of different types of particles, dissimilar particles may demonstrate dissimilar movement characteristics from one another based on differences in size, shape, thermal radiation absorption characteristics and other characteristics. This effect may be referred to as thermophoresis and may be controlled to manipulate the movement of particles.

Direct photophoresis occurs due to a transfer of photon momentum to a particle by refraction and reflection and a difference in refractive index between adjacent particles.

More specifically, particles may move relative to their surrounding medium when there is a difference in the refractive index between the particle and the surrounding medium. The refractive index is the ratio of the velocity of light in a vacuum to its velocity in a specified medium. A particle with a higher refractive index compared to its surrounding molecule or molecules may move away from the light source at a higher rate than the surrounding medium due to a difference in rate of momentum transfer between the particle and the surrounding medium as energy is absorbed from the photons of light that are scattered and absorbed from the particle. This transfer of momentum from photon to particle is referred to as radiation pressure force and is the force responsible for direct photophoresis and is dependent on light intensity and particle size but the momentum transfer and thus movement of the particle is not affected by the surrounding medium.

Indirect photophoresis may also be used to displace particles. Indirect photophoresis occurs as light heats one side of a particle suspended in a medium resulting in a temperature differential across the particle. Molecules in the surrounding medium may reach temperature equilibrium with the surface of the particle, that is, the molecules surrounding the particle on the heated side may experience an increase in temperature and molecules on the relatively cool side may remain relatively cool. Generally, the molecules on the relatively heated side of the particle will have a higher kinetic energy. Thus, these higher energy molecules, when impinging the particle, may impart a greater momentum change to the particle than the molecules on the relatively cool side of the particle resulting in a momentum gradient across the particle and tending to move the particle toward the area of lower momentum (i.e., from the relatively hot region toward the relatively cold region). The component of the photophoretic force responsible for this phenomenon is called the radiometric force. The indirect photophoretic effect may also be referred to as the "radiometric force."

Additionally, it is possible to select the wavelength of light and the particle size to control the movement of the particle. For example, a particle with a diameter less than or comparable to the wavelength of a given beam of light may be moved toward the light source due to negative indirect photophoresis. Negative indirect photophoresis may occur due to the unequal heat generation on the back and front sides of particles. That is, the wavelength of light may be selected such that it heats the side of a particle opposite the light source rather than the side of the particle facing the light source. This may result in a temperature gradient in the medium around the particle, causing the particle to move towards the light source.

An individual particle can be controlled using the photophoretic effect by utilizing astigmatism aberration. In general, an ideal lens has a single focal point for the light passing through a first side of the lens. Optical aberrations can be added to a lens to spread the light passing through the lens over a region rather than at the single focal point. Aberrations can be monochromatic or chromatic. Chromatic aberrations may occur due to dispersion, the variation of a lens's refractive index with wavelength. Additionally, a lens may have a positive or a negative spherical aberration that causes light passing through the edges of lens to have a different focal point than light passing through the center of the lens. If the light passing through the edges of the lens focuses nearer the lens, the aberration is positive and vice-a-versa.

Additionally, an optical system may utilize astigmatism to manipulate the focus of light. Astigmatism may occur in two forms: third-order and non-axisymmetric astigmatism. Light may propagate from a given point in two planes: tangential plane and a sagittal plane. Rays that propagate in the tangential plane are tangential rays. The tangential plane may also be called the meridional plane. The second plane is the sagittal plane and is defined as the plane orthogonal to the meridional plane. In third-order astigmatism, sagittal and transverse rays form foci at different distances along the optic axis. These foci may be referred to as the sagittal focus and the transverse focus, respectively. The amount of aberration due to astigmatism is proportional to the square of the angle between the rays from the object and the optical axis of the system. The principles of astigmatism may provide a tool for varying the intensity distribution of light to enable trapping a particle using the photophoretic effects described herein. Astigmatism and astigmatic aberration enable movement of the focal point of a beam of light (e.g., a laser). By controlling the focal point of a light beam, the location of a beam waist of the light can be controlled. One or more particles may be trapped at the beam waist based on the principles described herein and the location of the waist can be moved to move the trapped particle. In embodiments, one or more trapped particles may move along a beam path of a beam generated by a light source. For example, a trapped particle may be moved along a beam path by one or more of the photophoretic forces described herein. As used herein, the use of the phrase "to trap" with respect to the one or more scattering particles encompasses the use of a beam to move the scattering particles along a beam path of a beam generated by a light source.

Referring now generally to FIG. 1, a photophoretic display device includes a trap light source configured to generate a trap beam, an illumination light source configured to generate an illumination beam, a void, and a first reflective surface. One or more scattering particles may be dispersed within the void. The trap beam may enter the void and may trap one or more scattering particles. The trap beam may be incident on the first reflective surface at a first incidence angle and may be reflected as a first reflected trap beam. The first reflected trap beam may trap one or more scattering particles. The illumination beam may illuminate one or more of the one or more scattering particles that are trapped to generate a volumetric image. The volumetric image may be viewed from outside the photophoretic display device. In some embodiments, a control system may control a position or orientation of one or more of the trap light source and the illumination light source to aim the trap beam and the illumination beam. The control system may generally be connected to an external network of computers or other processing devices that may control the photophoretic display device using one or more instructions stored in a memory that includes one or more processor-readable instructions. Further embodiments of the system will be described in greater detail herein with reference specific reference to the drawings.

Specifically referring to FIG. 1, a photophoretic display device 100 including at least one trap light source 102, at least one illumination light source 104, and one or more scattering particles 106 is shown. The specific embodiment shown in FIG. 1 includes a light source head matrix 108 that includes a plurality of trap light sources 102. The plurality of trap light sources 102 are configured to generate a trap beam 110 that may reflect off of a first reflective surface 112 toward a second reflective surface 114. The second reflective surface 114 may reflect the trap beam 110 back toward the first reflective surface 112. Accordingly, the photophoretic display device 100 may generate a plurality of reflected trap beams. The first reflective surface 112 and the second reflective surface 114 may be separated by a void 116. Scattering particles 106 may be periodically refreshed in the void 116 through one or more inlets 118 and the photophoretic display device 100 may include a constituent detector 138 for detecting the concentration of scattering particles 106 within the void 116. The plurality of trap beams 110 may trap one or more scattering particles 106 and the scattering particles 106 may be illuminated by the illumination light source 104 to generate a volumetric image.

The photophoretic display device 100 may operate to trap and illuminate one or more scattering particles as described in greater detail herein. One or more of the trap light source 102 and the illumination light source 104 are one or more sources of light (e.g., laser, light emitting diodes, etc.). The trap light source 102 may be of sufficient frequency, amplification, and wavelength to manipulate the physical position (i.e., to move) one or more particles. In some embodiments, the light generated by the trap light source 102 may be outside the visual spectrum of light. For example, the trap light source 102 may use infrared light. The illumination light source 104 may be used to illuminate the one or more scattering particles 106 trapped and/or moved by the trap light source 102. The illumination light source 104 may be configured to illuminate the one or more trapped particles in any wavelength of light, for example, in visible light at any frequency on the visible spectrum, or in infrared or ultraviolet light. In some embodiments, the trap light source 102 and the illumination light source 104 may be combined into a single, co-linear beam of light, such that the one or more particles are trapped and illuminated by the same co-linear beam of light. The photophoretic display device 100 may include one or more lenses, reflectors, or other devices or implementations for bending, reflecting, focusing, or otherwise manipulating the light emitted by the trap light source 102 and the illumination light source 104.

Light from the trap light source 102 may be used to develop one or more forces across the one or more particles to trap the particle and control its movement in a three-dimensional environment. In embodiments, the trap light source 102 may move a trapped particle along a beam path of the light generated by the trap light source 102. In embodiments, the trap light source 102 may develop a temperature differential across the one or more scattering particles to create a difference in momentum across the scattering particles according to the principles described herein. In some embodiments, the one or more scattering particles may be manipulated by a radiation pressure force created by the beam generated by the trap light source 102. In some embodiments, the trap light source 102 may be sent through a microscope objective or some other device configured to focus a beam as described herein and the one or more scattering particles may be trapped at the beam waist, which may exhibit a strong electric field gradient. In some embodiments, lateral and axial (i.e., in the longitudinal direction of the beam generated by the trap light source 102) movement may be controlled using a specific light beam intensity profile that is generated with astigmatism aberration and a spatial light modulator (SLM). Additionally, the trap light source 102 may be used to turn, spin, polarize, or otherwise orient the one or more scattering particles in a particular polarization and/or orientation. For example, the trap light source 102 may apply orienting torque to a trapped particle by anisotropically scattering polarized light off of the trapped particle. In some embodiments, the trapped particle may be oriented by changing one or more of a wavelength, an amplitude, or a frequency of the beam generated by the trap light source 102. Accordingly, the scattering particles may move based on the movement of the trap light source 102. In some embodiments, the trap light source 102 may move the one or more scattering particles 106 at a rate faster than detectable by the human eye in order to generate a three-dimensional image in cooperation with the illumination light source 104. It is contemplated that embodiments include any number of trap light sources 102. Additionally, it is contemplated that any source of light can be used to generate the trap beam.

The illumination light source 104 may illuminate the one or more scattering particles with visible or other forms of light. For example, the illumination light source 104 may be an RGB LED that illuminates the one or more scattering particles with visible light. Visible light generated by the illumination light source 104 and reflected from the one or more scattering particles may be used to reproduce an image as seen by an observer, for example. The intensity, wavelength, and position of the illumination light source 104 and/or the trap light source 102 may be controlled, for example, by a controller or other system (e.g., a processor and memory module that stores one or more processor-readable instruction sets). While the particular embodiment depicted in FIG. 1 shows an illumination light source 104 that is beneath the void 116, it is to be understood that this is an example and that the illumination light source 104 could be positioned anywhere such that the one or more scattering particles 106 can be illuminated. It is contemplated that the illumination light source 104 may be configured in an array of illumination light sources and that one or more of the illumination light sources 104 may be moved, oriented, or repositioned to aim the illumination beam 134 at the one or more scattering particles 106.

The one or more scattering particles may be microscopic particles that reflect light when illuminated, for example, by the illumination light source 104. The scattering particles 106 may be, for example, water vapor. In some embodiments, the scattering particles 106 may be atomized water droplets. The water vapor may be periodically refreshed to the void 116 through the inlets 118. In some embodiments, the water vapor may be atomized using any means for atomizing water vapor. For example, the water vapor may be atomized using ultrasonic-assisted atomization or other ultrasonic forces, one or more fine spray nozzles, steam generation, humidification, or other water vapor generation techniques. In some embodiments, the void 116 may be a closed space such that the constituent particles in the void 116 are controlled. The constituency of the void 116 may be controlled, for example, with the inlets 118. In other embodiments, the void 116 may be open to atmosphere. In such embodiments, the scattering particles 106 may be water or water vapor that is organically present in the atmosphere (i.e., the atmospheric humidity). In some embodiments, the void 116 may include one or more humidity detectors for determining the amount of water vapor present within the void. The injection or reinjection of water vapor into the void 116 may be based on an input from the humidity detector. For example, the concentration of water vapor in the void may be maintained within an upper bound and a lower bound as determined by an input from the one or more humidity detectors.

In embodiments, the amount of water vapor suspended in the void 116 may be periodically refreshed based on some refreshment criteria. For example, the water vapor may condense from the air within the void 116 or coalesce and need to be replaced. In some embodiments, the refreshment criteria may include, for example, a humidity level within the void as measured by the constituent detector 138, a scattering particle density, a scattering particle temperature, an average scattering particle size, a resolution of the volumetric image, a number of particles trapped by the one or more trap beams, etc.

In some embodiments, the scattering particles 106 may include microscopic pieces of crushed silicon, silicon dioxide, silicon nitride, or other silicate product. In some embodiments, the scattering particles may be formed from a liquid, e.g., a liquid that can be used to create small flat particles. The scattering particles may be isotropic or anisotropic. In some embodiments, the void 116 may include one or more sections and each section may selectively include isotropic and/or anisotropic particles, such that the various sections of the void 116 can be viewed distinctly from different angles. Anisotropic scattering particles may include multiple surfaces for reflecting light in various ways that may enable two or more distinct images to be displayed from two or more distinct vantages. The anisotropic scattering particles may include, for example, multiply-sided mirrors or prisms with intricate structures that can reflect light anisotropically.

Still referring to FIG. 1, the light source head matrix 108 may be an array of multiple trap light sources 102 that is configured to house the trap light sources 102 such that they are aimable toward first reflective surface 112. The trap light sources 102 may be arranged in a row, each trap light source 102 comprising a substantially similar height with respect to the first reflective surface 112 such that the each trap light source 102 in the row of trap light sources 102 is aimed at a substantially similar angle as the other trap light sources 102 in the row. While the particular exemplary embodiment shown in FIG. 1 includes a single row of trap light sources 102, it is to be understood that embodiments may include any number of rows and/or columns of trap light sources 102 in the light source head matrix 108. In embodiments, the light source head matrix 108 may be steerable such that the aim of the trap light sources 102 is aimable with respect to the first reflective surface 112 by changing the angle of the first reflective surface 112. Additionally, in embodiments, the angle of each trap light source 102 in the light source head matrix 108 may be aimed individually. For example, the light source head matrix 108 may be positioned on a gimbal and/or the individual trap light sources 102 may be positioned on a gimbal. The angle of the light source head matrix 108 and the individual trap light sources 102 may be positionable with respect to one or more of the first reflective surface 112 and the second reflective surface 114.

Still referring to FIG. 1, the angle of one or more of the first reflective surface 112 and the second reflective surface 114 may be adjustable with respect to one or more of the light source head matrix 108 and the other of the first reflective surface 112 or the second reflective surface 114. Accordingly, the angle of the reflected trap beams may be adjusted to change the volumetric image.

Still referring to FIG. 1, in some embodiments, the intensity of the trap beam 110 may be adjusted to adjust the characteristics of the volumetric image. For example, increasing the intensity of the trap beam 110 may increase the number of particles that are able to be trapped by the trap beam 110. In some embodiments, the intensity of the trap beam 110 may be increased to increase the number of reflected beams that are able to hold scattering particles 106. In embodiments, the trap beam 110 may not be able to hold scattering particles 106 in place without sufficient intensity.

Because the intensity of the trap beam may degrade based on distance from it source and based on the number of reflections of the beam, the intensity can be controlled to increase or decrease based on the number of scattering particles that are desired to be held in place. In the particular embodiment shown in FIG. 1, there are fifteen (15) reflections of the trap beam between the first reflective surface 112 and the second reflective surface 114. However, it is to be understood that this is merely one example, and that any number of reflections could be made. In some embodiments, there may be no reflections of the trap light source 102.

In some embodiments, the distance between the first reflective surface 112 and the second reflective surface 114 may be changed to adjust the number of reflections between the first reflective surface 112 and the second reflective surface 114, which may change the number of scattering particles 106 trapped by the trap beam. For example, one or more of the first reflective surface 112 and the second reflective surface 114 may be moveable with respect to the other to change the distance between the two surfaces. In some embodiments, a distance between the light source head matrix 108 and the first reflective surface 112 may be adjustable. Accordingly, the distance the trap beam 110 travels between the light source head matrix 108 and the first reflective surface 112 may be adjustable, for example.

Still referring to FIG. 1, the trap beam 110 may be incident on the first reflective surface 112 at a first incidence angle 122. The first incidence angle 122 can be adjusted by moving one or more of the trap light source 102 and the first reflective surface 112 as described herein. The trap beam 110 may be reflected as a first reflected trap beam. In some embodiments, the angle of reflection is equal to the first incidence angle 122, but it is contemplated that the angle of reflection may not be equal to the first incidence angle 122. For example, the angle of reflection may be changed using one or more lenses, curvatures, etc. to change the angle of reflection. In some embodiments, each position where the trap beam 110 is incident on the first reflective surface 112 may include such a feature for changing the angle of reflection. Additionally, the trap beam 110 may be incident on the second reflective surface 114 at a second incidence angle 120 and may reflect from the second reflective surface 114 as a second reflected trap beam. In some embodiments, the angle of reflection off of the second reflective surface 114 is equal to the second incidence angle 120, but it is contemplated that the angle of reflection may not be equal to the first incidence angle 122. For example, the angle of reflection may be changed using one or more lenses, curvatures, etc. to change the angle of reflection. In some embodiments, each position where the trap beam 110 is incident on the first reflective surface 112 may include such a feature for changing the angle of reflection.

Figure 2:
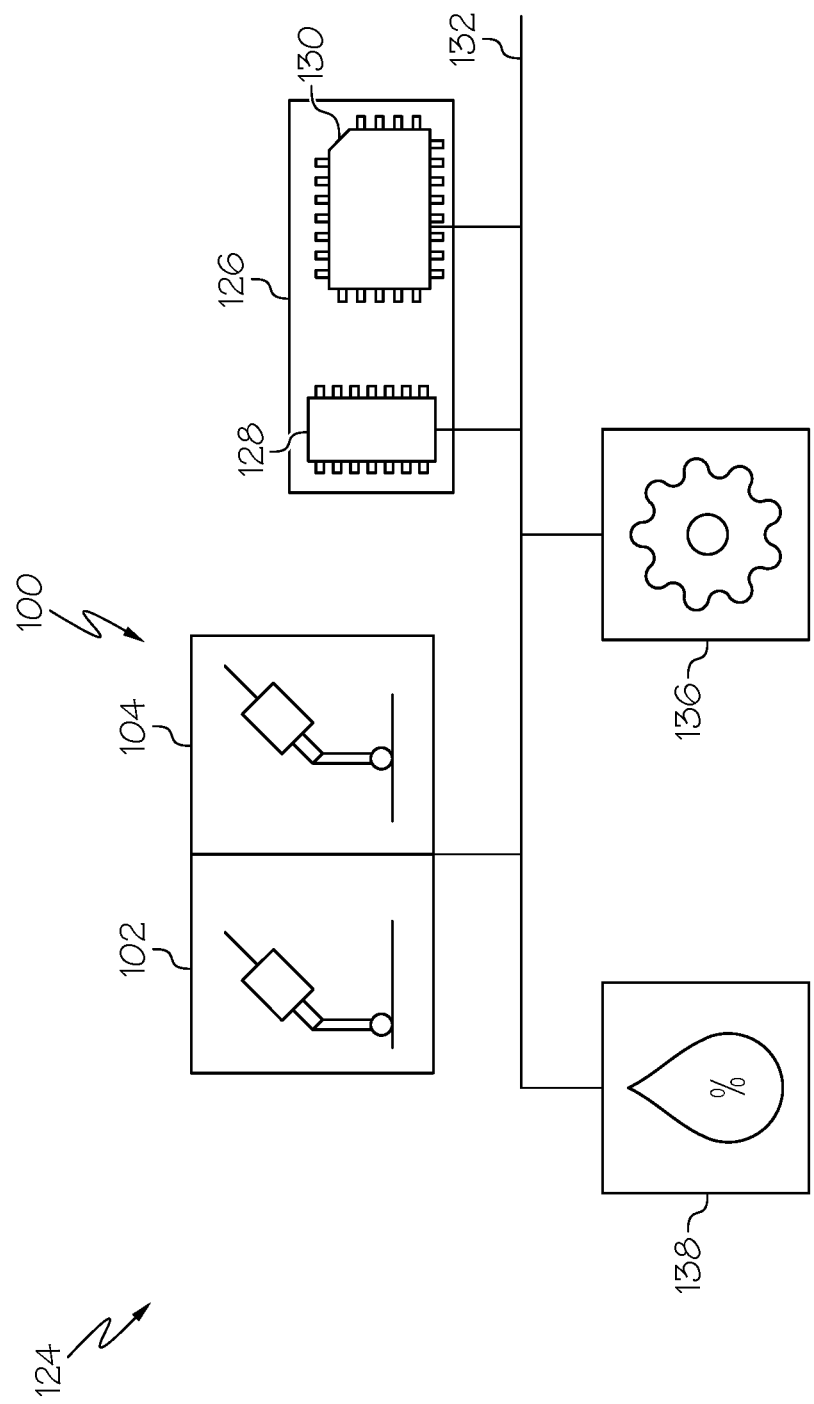
FIG. 2 depicts a schematic of a system for displaying a volumetric image including the photophoretic display device of FIG. 1, according to one or more embodiments shown and described herein.

Referring now to FIG. 2, a schematic of a system 124 for displaying one or more volumetric images using a photophoretic display device, such as the photophoretic display device 100 of FIG. 1, is shown. Still referring to FIG. 2, the system 124 includes the photophoretic display device 100 including the trap light source 102 and the illumination light source 104 of FIG. 1. Additionally, the system 124 includes a control module 126 that includes a processor 128 and a memory module 130. The control module 126 may control one or more of a position and an orientation of the trap light source 102 and the illumination light source 104 as discussed in greater detail herein. In some embodiments, the control module 126 is communicatively coupled to the trap light source 102 and the illumination light source 104 and may control, for example, a position and an orientation of the beams generated by each. The control module 126 and the photophoretic display device 100 may be communicatively coupled by, for example, a bus 132. A valve controller 136 may also be communicatively coupled to the bus. The valve controller 136 may control the flow rate of water through the inlets 118 of FIG. 1, for example. The constituent detector 138 may also be communicatively coupled to the bus 132 and configured to generate a signal based on a constituent percentage.

The processor 128 may include any processing component(s) configured to receive and execute programming instructions (such as from the memory module 130). The instructions may be in the form of a machine-readable instruction set stored in the memory module 130 (e.g., one or more programming instructions). Accordingly, the processor 128 may be an electric controller, an integrated circuit, a microchip, a computer, or any other computing device. The processor 128 is communicatively coupled to the other components of the system 124 through the bus 132. Accordingly, the bus 132 may communicatively couple any number of processors 128 with one another, and allow the components coupled to the bus 132 to operate in a distributed computing environment. In some embodiments, the bus 132 is a CAN bus. Each of the components may operate as a node that may send and/or receive data. Furthermore, while the embodiment depicted in FIG. 3 includes a single processor 128, some embodiments may include more than one processor 128.

The memory module 130 may be a volatile and/or nonvolatile digital storage component and, as such, may include random access memory (including SRAM, DRAM, and/or other types of random access memory), flash memory, registers, compact discs (CD), digital versatile discs (DVD), and/or other types of storage components. The memory module 130 may reside local to and/or remote from the system 124 and may be configured to store one or more pieces of data for access by the system 124 and/or other components.

The memory module 130 may be machine-readable memory (which may also be referred to as a non-transitory processor readable memory). The memory module 130 may be configured as volatile and/or nonvolatile memory and, as such, may include random access memory (including SRAM, DRAM, and/or other types of random access memory), flash memory, registers, compact discs (CD), digital versatile discs (DVD), and/or other types of storage components. Additionally, the memory module 130 may be configured to store operating logic, which may be embodied as a computer program, firmware, or hardware, as an example and that may include an operating system and/or other software for managing components of the system 124.

As noted above, the system 124 includes the bus 132. The bus 132 may be formed from any medium that is capable of transmitting a signal such as, for example, conductive wires, conductive traces, optical waveguides, or the like. Moreover, the bus 132 may be formed from a combination of mediums capable of transmitting signals. In one embodiment, the bus 132 includes a combination of conductive traces, conductive wires, connectors, and buses that cooperate to permit the transmission of electrical data signals to components such as processors, memories, sensors, input devices, output devices, and communication devices. Accordingly, the bus 132 may be or include a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The bus 132 communicatively couples the various components of the system 124. As used herein, the term "communicatively coupled" means that coupled components are capable of exchanging data signals with one another such as, for example, electrical signals via conductive medium, electromagnetic signals via air, optical signals via optical waveguides, and the like. In some embodiments, the bus 132 may be coupled to network interface hardware for communicatively coupling the system 124 with one or more external networks. For example, the system 124 may communicatively couple with one or more external cloud networks using a wireless network connection, for example, using a wi-fi connection and/or a connection to a cellular network.

The valve controller 136 may be any controller configured to change the position of a valve that may control the flow of water or other constituent through the inlets 118 (FIG. 1). The valve controller 136 may be a component in an industrial process system, for example, and may be programmed with any set point or set points based on, for example, a constituent concentration in the void 116. In some embodiments, the valve controller 136 may receive in an input from the constituent detector 138 that may be configured to detect a concentration of particles (e.g., a humidity level) within the void 116. The valve controller 136 may include one or more programmable logic controllers or distributed control systems that may control operation of the valve controller 136. The valve controller 136 may control the flow of constituents into the void 116 such that the introduction of constituents takes an introduction pattern that makes it more likely that the constituents will be trapped by the trap light source 102. The introduction pattern may be introduced using one or more shaped nozzles that are capable of shaping or otherwise affecting the pattern of constituents introduced to the void 116.

Referring to FIGS. 1 and 2, the constituent detector 138 may be configured to detect one or more of the temperature and the concentration of water vapor in the void 116. The constituent detector 138 may include one or more of a thermometer, a barometer, a psychrometer, or any gravimetric, capacitive, resistive, or thermal humidity detector.

Figure 3:
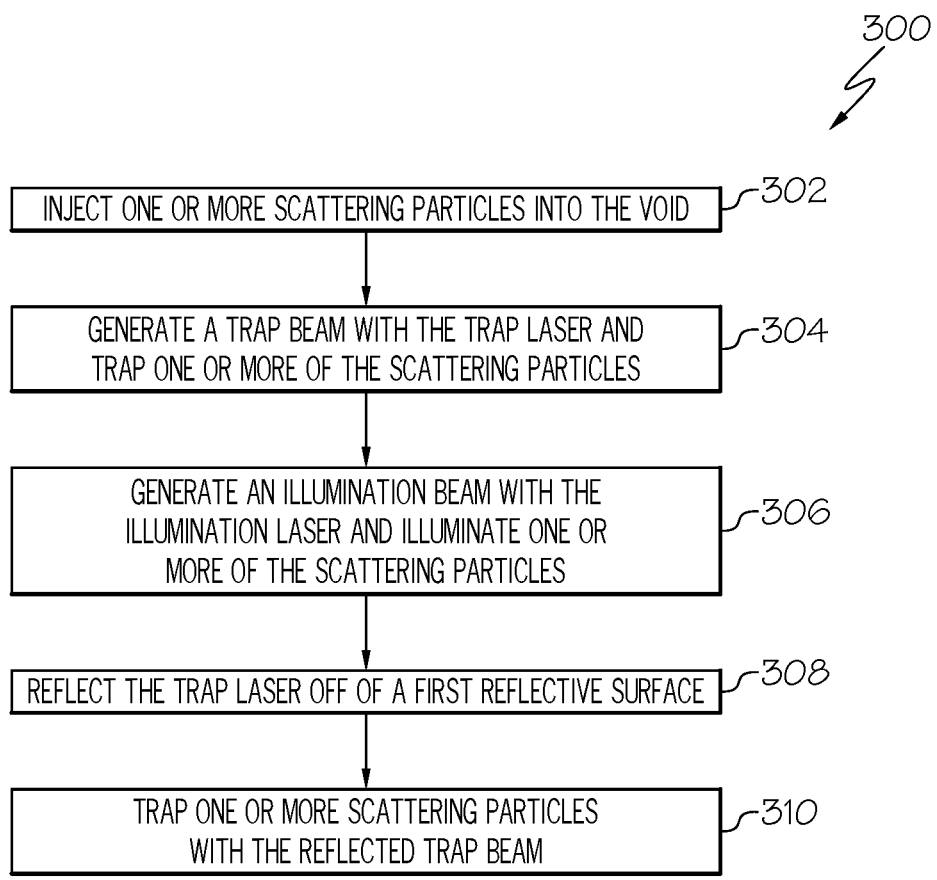
FIG. 3 depicts a method of displaying a volumetric image using the photophoretic display device of FIG. 1, according to one or more embodiments shown and described herein.

Referring now to FIG. 3, a method 300 of displaying a volumetric image using a photophoretic display device comprising at least one trap light source 102 configured to generate a trap beam configured to trap one or more scattering particles, at least one illumination light source 104 configured to generate an illumination beam, a void, and a first reflective surface is described.

The method includes injecting one or more scattering particles 106 into the void 116 at step 302. The scattering particles 106 may be injected into the void 116 using, for example, one or more spray devices for spraying water vapor. In some embodiments, the water vapor may be atomized water vapor. The water vapor may be atomized, for example, using ultrasonic-assisted atomization or other ultrasonic forces, one or more fine spray nozzles, steam generation, humidification, or other water vapor generation techniques. Accordingly, in some embodiments, the system 124 may include one or more systems for generating atomized water vapor. It should be understood that water vapor is an example of constituent for use as the one or more scattering particles 106 and that other potential constituents are considered. For example, one or more aerosols, liquids, or other gases may be used as a constituent.

In some embodiments, the concentration of constituent may be controlled between set points. For example, a humidity within the void 116 may be controlled using an input from the constituent detector 138. The inlets 118 may open and close automatically to maintain the constituent levels within the set points. The inlets 118 may be controlled for example, by the valve controller 136, which may open the inlets 118 to inject constituent and may close the inlets 118 to stop the injection of constituent.

The method 300 further includes generating a trap beam 110 with the trap light source 102 and trapping one or more of the one or more scattering particles 106 with the trap beam 110 at step 304. The scattering particles 106 may be trapped, for example, at a beam waist of the trap beam 110. In some embodiments, the scattering particles 106 are trapped without respect to any particular orientation. For example, the optical properties of the scattering particles 106 may be isotropic and the scattering particles 106 may not be trapped in any particular orientation. Such an arrangement may produce a volumetric image that appears essentially equivalent from any given angle. In other embodiments, the optical properties of the scattering particles 106 may be anisotropic and the scattering particles may not be trapped in any particular orientation. Such an arrangement may produce a volumetric image that appears different from different viewing angles or positions. For example, a portion or portions of the volumetric image may be occluded based on one or more anisotropic optical properties of the scattering particles 106, which may reflect light from the illumination beam 134 anisotropically.

The method 300 further includes generating an illumination beam 134 with the illumination light source 104 and illuminating one or more of the scattering particles 106 with the illumination beam at step 306. The illumination beam 134 may be aimed directly at the one or more scattering particles 106 to illuminate one or more scattering particles 106 and/or may be reflected off of one or more of the first reflective surface 112 and the second reflective surface 114 to illuminate one or more of the one or more scattering particles 106. The scattering particles 106 may be illuminated in any color of visible light. In some embodiments, the illumination light source 104 illuminates the scattering particles 106 with infrared and/or ultraviolet light. Accordingly, the illumination light source 104 may be capable of projecting light at the appropriate wavelength for illuminating the scattering particles 106 with visible, infrared, or ultraviolet light.

The method 300 further includes reflecting the trap beam 110 off of the first reflective surface 112 as a first reflected trap beam 140 at step 308. The first reflected trap beam 140 may reflect from the first reflective surface 112 at any angle. For example, the first reflected trap beam 140 may reflect at an angle that is opposite and equal to the first incidence angle 122 at which the trap beam 110 is incident upon the first reflective surface 112.

The method 300 further includes trapping one or more of the one or more scattering particles 106 with the first reflected trap beam 140 at step 310. The first reflected trap beam 140 may reflect from the first reflective surface 112 with essentially the same optical properties that characterized the beam before it was incident on the first reflective surface 112. Accordingly, it may reflect with the same properties and may trap one or more scattering particles 106 according to the principles of photophoresis described herein.

In some embodiments, the first reflected trap beam 140 may be incident on the second reflective surface 114 at a second incidence angle 120 and may be reflected from the second reflective surface 114 as a second reflected trap beam 142. The second reflected trap beam 142 may be subsequently reflected from the first reflective surface 112 and this process of reflection may continue back and forth between the first reflective surface 112 and the second reflective surface 114. In some embodiments, the reflection may continue between the first reflective surface 112 and the second reflective surface 114 based on the optical properties of the trap beam 110, the first reflective surface 112, and the second reflective surface 114. In some embodiments, one or more of the intensity of the trap beam 110 and the geometry between the first reflective surface 112 and the second reflective surface 114 may be changed to affect the number of reflections of the trap beam 110 between the first reflective surface 112 and the second reflective surface 114. For example, the distance between the two surfaces may be decreased in order to increase the number of reflections of the trap beam 110. In other embodiments, the intensity of the trap beam 110 may be increased to increase the number of reflections of the trap beam 110 between the first reflective surface 112 and the second reflective surface 114.

Increasing the number of reflections between the first reflective surface 112 and the second reflective surface 114 may increase the number of scattering particles 106 trapped by the trap beam 110 or change the shape or structure of the volumetric image generated by the photophoretic display device 100. For example, reducing the initial angle of incidence on the first reflective surface 112 may reduce the subsequent angles of incidence of the second reflective surface 114 and first reflective surface 112 that are generated by the subsequent reflections of the trap beam 110. Reducing the first angle may cause more overall reflections back-and-forth between the two surfaces, thereby increasing the number of scattering particles 106 that can be trapped. However, in some embodiments, the intensity of the beam may decrease below a point where the trap beam 110 is effective at trapping one or more scattering particles 106 after a given number of reflections, as the ability of the trap beam 110 to trap may wane with the intensity of the trap beam 110 at each reflection. Accordingly, in some embodiments, the intensity of the trap beam 110 may be controlled (e.g. increased or decreased) to control the number of scattering particles 106 trapped and thus to control the visual characteristics of the volumetric image.

Referring now to FIG. 4, a particular example embodiment of the photophoretic display device 100 is shown. FIG. 4 shows the photophoretic display device 100 as a display 400 in a vehicle 40. FIG. 4 shows the light source head matrix 108 including at least one trap light source 102. The display 400 also includes at least one illumination light source 104, the first reflective surface 112, the second reflective surface 114, and a plurality of inlets 118 for injecting the one or more scattering particles 106. The inlets 118 are connected to an HVAC system 402 of the vehicle 40 through HVAC ducting 404. The one or more scattering particles 106 are injected through the inlets 118 which may use the HVAC system 402 for the motive force for injecting the one or more scattering particles 106. It should be understood that the arrangement of elements of the display 400 in the vehicle 40 is not limited to the depicted arrangement.

The display 400 may operate according to the principles described herein to project a volumetric image. That is, the trap light source 102 may trap one or more of the one or more scattering particles 106 and the illumination light source 104 may illuminate the trapped scattering particles to generate an image. The display 400 may move one or more of the trap light source 102, the illumination light source 104, the first reflective surface 112, and the second reflective surface 114 to generate the image. In some embodiments, the display 400 may be configured to receive a user input signal or other signal and may display and change the image based on the signal. The display 400 may be controlled by a control module, such as the control module 126 shown in FIG. 2. Still referring to FIG. 4, the signal to produce and/or control the image may come from one or more of, for example, a navigation system, an entertainment system, a camera, a user input device (e.g., a smartphone, tablet, etc.), and the like. The one or more scattering particles 106 may be injected into a space between the first reflective surface 112 and the second reflective surface 114 by the HVAC system 402 of the vehicle 40 and may be periodically refreshed or replaced within the space between the two reflective surfaces as described herein.

Figure 5B:
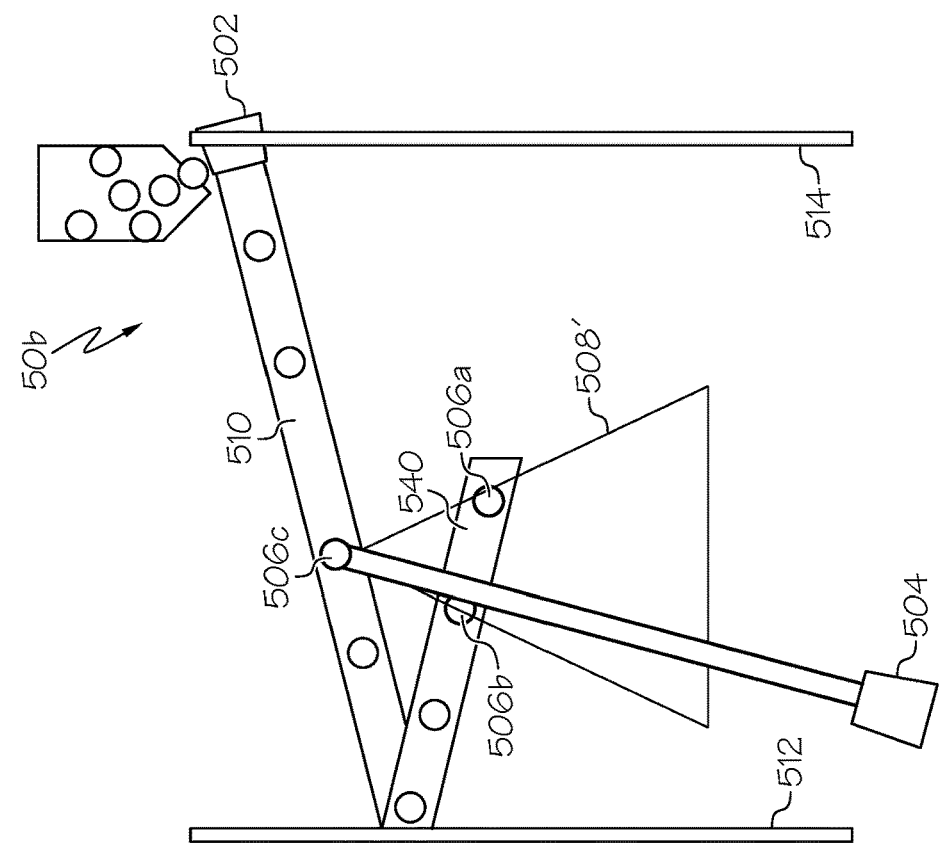
FIG. 5B depicts the illustrative embodiment of the example photophoretic display device of FIG. 5A at a second instance, according to one or more embodiments shown and described herein.
Figure 5A:
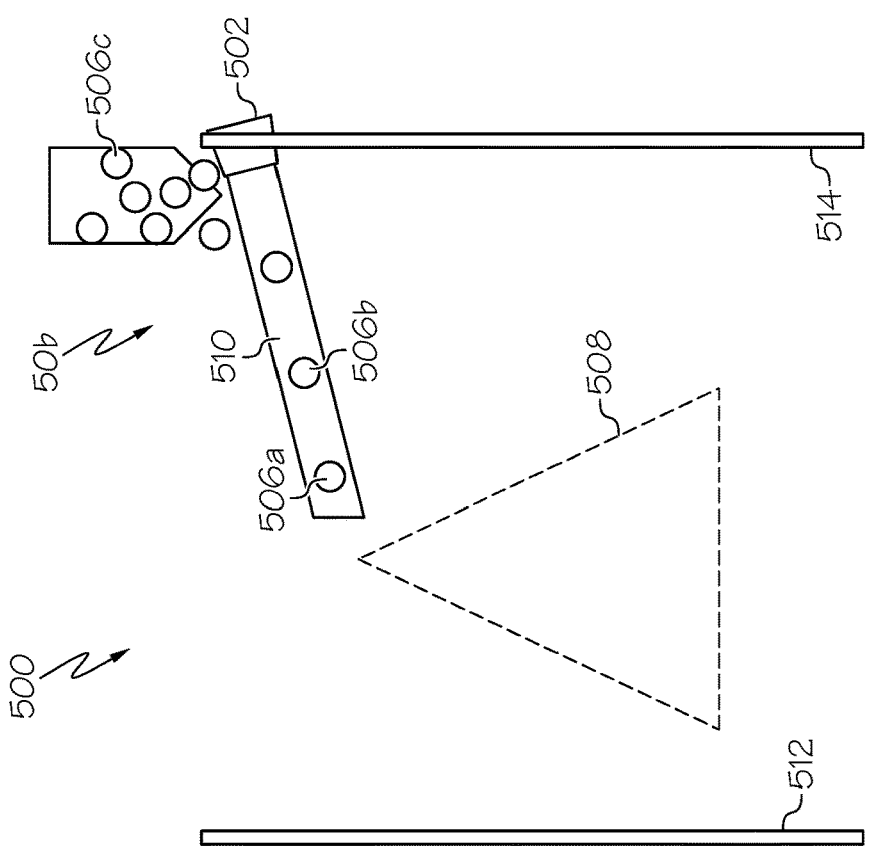
FIG. 5A depicts an illustrative embodiment of an example photophoretic display device at a first instance, according to one or more embodiments shown and described herein.

Referring now to FIGS. 5A and 5B, an illustrative embodiment of an example photophoretic display device at a first instance and a second instance are depicted, respectively. FIG. 5A depicts a system 500 for displaying a volumetric image including a trap light source 502 and illumination light source 504. The trap light source 502 traps one or more scattering particles 506 and specifically traps a first trapped particle 506a and a second trapped particle 506b with the trap beam 510. The trap beam 510 is aimed at a first reflective surface 512. A third particle 506c is not trapped by the trap beam but is between the first reflective surface 512 and a second reflective surface 514.

FIG. 5B depicts the system 500 at a second instance. As shown in FIG. 5B, a greater number of the one or more scattering particles 506 are trapped by the trap beam 510 and the trap beam 510 is reflected off the first reflective surface 512 toward the second reflective surface 514 as a first reflected trap beam 540. The first trapped particle 506a and the second trapped particle 506b have moved between the times of the first instance shown in FIG. 5A and the second instance shown in FIG. 5B. More specifically, the first trapped particle 506a and the second trapped particle 506b move along a beam path of the trap beam 510 moved by forces created by the trap beam 510 as described herein between the first instance and the second instance. The trap light source 502 moves the first particle 506a and the second trapped particle 506b such that they reflect off of the first reflective surface 512 along with the trap beam 510. FIG. 5B depicts the first trapped particle 506a and the second trapped particle 506b in an illumination region 508'. The illumination region is defined by an area or volume of space within which scattering particles are illuminated. Additionally, as shown in FIG. 5B, the third particle 506c has been trapped by the trap beam 510 and is now a third trapped particle 506c. In FIG. 5B, the first trapped particle 506a, the second trapped particle 506b, and the third trapped particle 506c have all been moved by the trap beam 510 generated by the trap light source 502 to the illumination region 508' and are illuminated by the illumination light source 504.

It should now be understood that a photophoretic display device may include a trap light source configured to generate a trap beam, an illumination light source configured to generate an illumination beam, a void, and a first reflective surface. One or more scattering particles may be dispersed within the void and the trap beam may enter the void and may trap one or more scattering particles. Additionally, the trap beam may be incident on the first reflective surface at a first incidence angle and may be reflected as a first reflected trap beam that may also trap one or more scattering particles. The illumination beam may illuminate one or more of the one or more scattering particles that are trapped to generate a volumetric image. In some embodiments, a control system may control a position or orientation of one or more of the trap light source and the illumination light source to aim the trap beam and the illumination beam. The control system may generally be connected to an external network of computers or other processing devices that may control the photophoretic display device using one or more instructions stored in a memory that includes one or more processor-readable instructions. Accordingly, a user can create and control a volumetric image using the photophoretic display device described herein.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A photophoretic display device comprising:
   at least one trap light source configured to generate a trap beam;
   at least one illumination light source configured to generate an illumination beam;
   a void; and
   a first reflective surface; wherein
   the trap beam enters the void and traps a first one or more scattering particles,
   the trap beam is incident on the first reflective surface at a first incidence angle and is reflected as a first reflected trap beam,
   the first reflected trap beam traps a second one or more scattering particles, and
   the illumination beam illuminates the first one or more scattering particles and the second one or more scattering particles that are trapped to generate a volumetric image.

2. The photophoretic display device of claim 1, further comprising:
   a second reflective surface, wherein
   the first reflected trap beam is incident on the second reflective surface at a second incidence angle and is reflected as a second reflected trap beam, and
   the second reflected trap beam traps a third one or more scattering particles.

3. The photophoretic display device of claim 2, wherein the trap beam is subsequently reflected between the first reflective surface and the second reflective surface to form one or more subsequent reflected trap beams and each subsequent reflected trap beam traps an additional one or more scattering particles.

4. The photophoretic display device of claim 3, wherein the number of reflected trap beams is based on an intensity of the trap beam.

5. The photophoretic display device of claim 3, wherein the number of reflected trap beams is based on a distance between the first reflective surface and the second reflective surface.

6. The photophoretic display device of claim 2, wherein a distance between the first reflective surface and the second reflective surface is adjustable.

7. The photophoretic display device of claim 2, wherein:
the first one or more scattering particles are moved by the trap beam toward the first reflective surface along a beam path and reflected off of the first reflective surface and moved toward the second reflective surface in the first reflected trap beam.

8. The photophoretic display device of claim 1, further comprising a plurality of trap light sources in a trap light source array configured to generate a plurality of trap beams, wherein
each of the plurality of trap beams enters the void and traps an initial one or more scattering particles and is incident on the first reflective surface,
the plurality of trap beams are reflected from the first reflective surface as a plurality of first reflected trap beams, and
each of the plurality of trap beams traps a subsequent one or more scattering particles.

9. The photophoretic display device of claim 8, wherein the one or more scattering particles are atomized water droplets.

10. The photophoretic display device of claim 9, wherein the atomized water droplets are introduced to the void in an introduction pattern that increases the probability that an atomized water droplet will be trapped by a trap light source.

11. The photophoretic display device of claim 9, wherein a concentration of atomized water droplets in the closed environment is refreshed based on one or more refreshment criteria.

12. The photophoretic display device of claim 11, wherein the refreshment criteria includes one or more of a water droplet density, a water droplet temperature, an average water droplet size, a resolution of the volumetric image, and a number of particles trapped by the one or more trap beams.

13. A system for reflecting at least one trap beam of a photophoretic display device, the system comprising:
at least one trap light source for generating the at least one trap beam; and
a first reflective surface, wherein
the at least one trap beam traps one or more scattering particles,
the at least one trap beam is incident on and reflected from the first reflective surface as at least one first reflected trap beam, and
the at least one first reflected trap beam traps a second one or more scattering particles.

14. The system of claim 13, further comprising a second reflective surface that is spaced apart from the first reflective surface forming a void, wherein
the first reflected trap beam is reflected from the second reflective surface as a second reflected trap beam, and
the second reflected trap beam traps a third one or more scattering particles.

15. The system of claim 13, wherein the one or more scattering particles are positioned in the void and the one or more scattering particles are water vapor.

16. The system of claim 13, wherein the at least one trap beam is incident on the first reflective surface at a first angle of incidence and is reflected from the first reflective surface at a first angle of reflection.

17. The system of claim 16, wherein the first angle of incidence equals the first angle of reflection.

18. A method of displaying a volumetric image using a photophoretic display device comprising at least one trap light source configured to generate a trap beam configured to trap one or more scattering particles, at least one illumination light source configured to generate an illumination beam, a void, and a first reflective surface, the method comprising:
injecting the one or more scattering particles into the void;
generating a trap beam with the trap light source and trapping a first one or more of the one or more scattering particles with the trap beam;
generating an illumination beam with the illumination light source and illuminating the first one or more of the scattering particles with the illumination beam;
reflecting the trap beam off of the first reflective surface as a first reflected trap beam; and
trapping a second one or more of the one or more scattering particles with the first reflected trap beam.

19. The method of claim 18, further comprising:
reflecting the first reflected trap beam off of a second reflective surface as a second reflected trap beam; and
trapping a third one or more of the one or more scattering particles with the second reflected trap beam.

20. The method of claim 19, wherein the one or more scattering particles are one or more atomized water droplets.

* * * * *